United States Patent
Weaks

(10) Patent No.: US 9,384,453 B2
(45) Date of Patent: Jul. 5, 2016

(54) ENGINE DIAGNOSTIC SYSTEM FOR HIGH VOLUME FEEDBACK PROCESSING

(71) Applicant: Cummins Inc., Columbus, IN (US)

(72) Inventor: Helena L. Weaks, Maineville, OH (US)

(73) Assignee: Cummins Inc., Columbus, IN (US)

( * ) Notice: Subject to any disclaimer, the term of this patent is extended or adjusted under 35 U.S.C. 154(b) by 33 days.

(21) Appl. No.: 14/260,989

(22) Filed: Apr. 24, 2014

(65) Prior Publication Data

US 2014/0324276 A1      Oct. 30, 2014

Related U.S. Application Data

(60) Provisional application No. 61/817,623, filed on Apr. 30, 2013.

(51) Int. Cl.
| | |
|---|---|
| G07C 5/00 | (2006.01) |
| G07C 5/08 | (2006.01) |
| G06Q 10/06 | (2012.01) |
| G06Q 10/10 | (2012.01) |
| G06Q 10/00 | (2012.01) |

(52) U.S. Cl.
CPC .............. *G06Q 10/063* (2013.01); *G06Q 10/10* (2013.01); *G06Q 10/20* (2013.01)

(58) Field of Classification Search
CPC ...... G06Q 10/063; G06Q 10/10; G06Q 10/20
See application file for complete search history.

(56) References Cited

U.S. PATENT DOCUMENTS

| | | | |
|---|---|---|---|
| 6,820,072 B1 | 11/2004 | Skaanning et al. | |
| 7,209,860 B2 * | 4/2007 | Trsar et al. | 702/183 |
| 7,373,225 B1 | 5/2008 | Grier et al. | |
| 7,373,226 B1 | 5/2008 | Cancilla et al. | |
| 7,580,906 B2 | 8/2009 | Faihe | |
| 7,739,007 B2 | 6/2010 | Logsdon | |
| 8,019,503 B2 | 9/2011 | Andreasen et al. | |
| 8,068,951 B2 | 11/2011 | Chen et al. | |

* cited by examiner

*Primary Examiner* — Jerrah Edwards
*Assistant Examiner* — Adam Mott
(74) *Attorney, Agent, or Firm* — Foley & Lardner LLP

(57) ABSTRACT

An engine diagnostic system in accordance with an embodiment not only captures the written feedback from each technician, but also tracks every step/click that the technician took during the diagnostic process and classifies those clicks into desirable or undesirable behavior patterns that indicate missing or miss-tagged content, inefficiently presented materials, or training issues such as not following troubleshooting guidance. The system provides daily updates of troubleshooting status's of diagnoses being conducted on millions of engine systems that represent a great amount of different engine models and types from around the globe, and provides data reduction techniques and metrics that guides the analyst/service engineers to high priority emerging issues reduced to specific actionable events that can be corrected and immediately monitored for their impacts on the troubleshooting system efficiency measures. Therefore, the technician not only provides direct information through purposeful feedback, he is also providing very valuable but less direct information through tracking his interactions with the system.

17 Claims, 7 Drawing Sheets

| Distributor | Branch | Number of Engine Diagnostic Sessions | Number of Engine Diagnostic Sessions Closed as Unsuccessful | % of Unsuccessful Engine Diagnostic Sessions |
|---|---|---|---|---|
| 3742 | Newark | 294 | 29 | 9.86 |
| 2860 | Henderson | 322 | 22 | 6.83 |
| 2850 | Cleveland (Walton Hills) | 89 | 21 | 23.6 |
| 56330 | Pointe | 128 | 21 | 16.41 |
| 3742 | Bristol | 166 | 21 | 12.65 |
| 3520 | Oak Creek | 211 | 21 | 9.95 |
| 2860 | West Valley City | 287 | 20 | 6.97 |
| 2466 | North Little Rock | 83 | 18 | 21.69 |
| 2680 | Renton | 241 | 18 | 7.47 |
| 3742 | Bronx | 193 | 17 | 8.81 |
| 3742 | Tunkhannock | 63 | 16 | 25.4 |
| 56270 | Calgary | 100 | 16 | 16 |

FIG. 2

| Symptom/Fault Code | Total Engine Diagnostic Sessions | Number of Engine Diagnostic Sessions without Solution | % of Engine Diagnostic Sessions without Solution |
|---|---|---|---|
| FAULT CODES – No Fault Codes Present or Non-Electronic Engine | 1384 | 186 | 13 |
| ENGINE PERFORMANCE SYMPTOM – Runs Rough or Misfires | 277 | 37 | 13 |
| ENGINE PERFORMANCE SYMPTOM – Low Power | 272 | 37 | 14 |
| EXHAUST SMOKE COLOR – Black Smoke | 249 | 33 | 13 |
| FAULT CODES – 559 | 171 | 32 | 19 |
| ENGINE LEAK – Coolant Loss – Internal | 845 | 30 | 4 |
| NOISE SYMPTOM – Engine Noise | 148 | 28 | 19 |
| ENGINE STARTING SYMPTOM – Crank No Start | 120 | 27 | 23 |
| FAULT CODES – 3376 | 134 | 26 | 19 |
| FAULT CODES – 3582 | 209 | 24 | 11 |
| ENGINE PERFORMANCE SYMPTOM – Engine Stalls/Shutdown | 64 | 21 | 33 |
| ENGINE STARTING SYMPTOM – Hard Start/Long Crank Time | 67 | 19 | 28 |
| EXHAUST SMOKE COLOR – White Smoke | 138 | 18 | 13 |
| FAULT CODES – 2637 | 212 | 16 | 8 |
| FAULT CODES – 2639 | 152 | 16 | 11 |
| ENGINE LEAK – Coolant Leak – External | 293 | 14 | 5 |
| FAULT CODES – 2387 | 366 | 14 | 4 |
| AFTERTREATMENT SYMPTOM – Stationary Regeneration Not Completing | 127 | 13 | 10 |
| AFTERTREATMENT SYMPTOM – Excessive Regeneration | 119 | 13 | 11 |
| NOISE SYMPTOM – Turbocharger Noise | 124 | 12 | 10 |

FIG. 3

| Case Name | Case Title | Frequency | Avg Location In List | Min Location In List | Max Location In List | stddev Location in List |
|---|---|---|---|---|---|---|
| K84245539 | Internally leaking EGR cooler | 2301 | 2.46 | 0.00 | 25.00 | 0.92 |
| K62597872 | Malfunctioning aftertreatment fuel injector | 1549 | 1.83 | 0.00 | 6.00 | 0.92 |
| K04121369 | External lubricating oil leak | 1388 | 1.03 | 1.00 | 11.00 | 0.51 |
| K00541975 | Damaged VGT Actuator | 1290 | 3.07 | 0.00 | 18.00 | 1.92 |
| K53501161 | ECM calibration | 1237 | 4.88 | 0.00 | 16.00 | 2.50 |
| K34412017 | Stuck open or leaking EGR valve | 711 | 1.07 | 0.00 | 3.00 | 0.32 |
| K89021914 | Filter plugged or partially obstructed | 709 | 1.03 | 0.00 | 4.00 | 0.29 |
| K25224542 | Exhaust leaks in aftertreatment exahust sys | 472 | 1.33 | 0.00 | 36.00 | 2.28 |
| K01756105 | Coolant leaks from the engine components | 430 | 1.07 | 0.00 | 4.00 | 0.34 |
| K83191640 | Engine component(s) coolant leaks | 430 | 1.16 | 1.00 | 5.00 | 0.42 |
| K21346340 | Stuck open or leaking EGR valve | 418 | 1.01 | 0.00 | 3.00 | 0.13 |
| K91531520 | Seized VGT | 360 | 3.70 | 0.00 | 20.00 | 2.80 |
| K57163648 | Damaged sensor/component pins | 335 | 1.71 | 0.00 | 5.00 | 1.00 |
| K37047092 | Leaking exhaust system components | 325 | 1.07 | 1.00 | 3.00 | 0.26 |
| K09020327 | Leaks in the charge air system | 304 | 3.13 | 1.00 | 40.00 | 3.74 |
| K19521242 | Aftertreatment stationary regeneration need | 297 | 2.39 | 0.00 | 3.00 | 0.57 |
| K30445828 | Stuck in-range exhaust pressure sensor | 295 | 2.16 | 2.00 | 8.00 | 0.81 |
| K13895948 | Malfunctioning turbocharger speed sensor | 294 | 1.89 | 0.00 | 2.00 | 0.32 |
| K80187625 | Malfunctioning fuel injector | 288 | 4.59 | 1.00 | 46.00 | 5.15 |
| K31401532 | External fuel leaks | 286 | 1.03 | 1.00 | 2.00 | 0.17 |
| K11595339 | Plugged EGR differential pressure sensor | 258 | 2.76 | 0.00 | 13.00 | 1.75 |
| K53787502 | Malfunctioning exhaust gas pressure sensr | 254 | 1.22 | 1.00 | 4.00 | 0.72 |

FIG. 4

| Symptom/Fault Case | Case Name | Case Title | Frequency | Avg Location In List | Min Location In List | Max Location In List | stddev Location in List |
|---|---|---|---|---|---|---|---|
| FAULT CODES - 1942 | K10273524 | Malfunctioning crankcase pressure sensor | 17 | 3.13 | 3 | 5 | 0.5 |
| FAULT CODES - 1942 | K43662142 | Plugged crankcase breather filter element | 7 | 1 | 1 | 1 | 0 |
| FAULT CODES - 1942 | K01201150 | Malfunctioning crankcase pressure sensor | 6 | 6 | 6 | 6 | 0 |
| | K00541975 | Damaged VGT actuator | 2 | | | | |
| FAULT CODES - 1942 | K84245539 | Internally leaking EGR cooler | 2 | 1 | 0 | 2 | 1.41 |
| | K09020327 | Leaks in the charge air system | 1 | | | | |
| | K27302235 | Aftertreatment DEF dosing unit | 1 | 4 | 4 | 4 | |
| | K31257310 | Plugged EGR differential pressure sensor tubes | 1 | 2 | 2 | 2 | 0 |
| | K34412017 | Stuck open or leaking EGR valve | 1 | 1 | 1 | 1 | 0 |
| | K53501161 | ECM calibration revision history check | 1 | 3 | 3 | 3 | 0 |
| | K57163648 | Damaged sensor/component pins | 1 | 2 | 2 | 2 | |
| | K59212516 | Fuel gear pump malfunctioning | 1 | 4 | 4 | 4 | |
| | K62597872 | Malfunctioning aftertreatment fuel injector | 1 | 2 | 2 | 2 | |
| | K63945456 | Short or open circuit in the wiring harness | 1 | 4 | 4 | 4 | |
| | K74130253 | Crankcase pressure supply wire open circuit | 1 | 2 | 2 | 2 | |
| | K80187625 | Malfunctioning fuel injector | 1 | 4 | 4 | 4 | |
| | K83191640 | Engine component(s) coolant leaks | 1 | 1 | 1 | 1 | |
| | K89021914 | Aftertreatment diesel particulate filter is plugged | 1 | 0 | 0 | 0 | |
| FAULT CODES - 1942 | K91531520 | Seized VGT | 1 | 0 | 0 | 0 | 0 |

FIG. 5

ENGINE DIAGNOSTIC SYSTEM FOR HIGH VOLUME FEEDBACK PROCESSING

CROSS-REFERENCE TO RELATED APPLICATIONS

This application claims the benefit of and priority to U.S. Provisional Patent Application No. 61/817,623, filed Apr. 30, 2013, entitled "ENGINE DIAGNOSTIC SYSTEM FOR HIGH VOLUME FEEDBACK PROCESSING," which is incorporated herein by reference in its entirety.

FIELD OF THE INVENTION

The present invention relates generally to diesel engines and more particularly to diagnostic systems for such engines.

BACKGROUND

Vehicular engine and engine systems can fail for a variety of reasons. In the event of a customer recognizing one or more engine malfunction symptoms (e.g., a cylinder misfire), the customer may bring the vehicle to a service technician. Conventional engine troubleshooting knowledge systems are designed to allow technicians to look up troubleshooting documentation given various symptoms, where the success criteria for the system is generally based on written feedback for each troubleshooting solution in combination with a rating provided by a user of the system. Metrics for measures of success are based on the number of feedbacks, response times for the feedback, and some summary statistics for the ratings.

SUMMARY

One embodiment relates to an engine diagnostic system comprising an analytics module, a data filtering module, and a dashboard module. The analytics module is structured to receive data regarding each engine diagnostic session in a plurality of engine diagnostic sessions, and generate an audit trail based on the data for each engine diagnostic session. The data filtering module is structured to receive the plurality of audit trails and determine a quality of each audit trail in the plurality of audit trails, wherein a determined quality audit trail is stored and a determined low quality audit trail is removed. The dashboard module is structured to receive the stored audit trails and provide one or more reports related to the stored audit trails. The analytics module is further structured to receive the one or more reports and provide at least one potential repair solution in a subsequent engine diagnostic session based on the one or more reports.

Another embodiment relates to an engine diagnostic system comprising an analytics module, a data filtering module, and a dashboard module. The analytics module is structured to: receive a symptom of an engine malfunction in a first engine diagnostic session; provide a guided question based on the symptom; receive a response to the guided question; provide at least one potential repair solution based on the response to the guided question; receive data regarding the first engine diagnostic session; and generate an audit trail based on the data, the provided guided question, and the received response. The dashboard module is structured to receive a plurality of audit trails for a plurality of engine diagnostic sessions and provide one or more reports related to the plurality of audit trails. The analytics module is further structured to receive the one or more reports, receive a symptom of an engine malfunction in a subsequent engine diagnostic session, and provide a subsequent at least one potential repair solution based on the one or more reports.

Yet another embodiment relates to a method of troubleshooting an engine in an engine diagnostic session, comprising: receiving data regarding each engine diagnostic session in a plurality of engine diagnostic sessions; generating an audit trail based on the data for each engine diagnostic session; receiving a plurality of audit trails; determining a quality of each audit trail in the plurality of audit trails, wherein a determined quality audit trail is stored and a determined low quality audit trail is removed; generating one or more reports related to the stored audit trails; and providing at least one potential repair solution in a subsequent engine diagnostic session based on the one or more reports.

These and other features, together with the organization and manner of operation thereof, will become apparent from the following detailed description when taken in conjunction with the accompanying drawings.

BRIEF DESCRIPTION OF THE DRAWINGS

FIG. 2 is an illustration of a utilization of a drill down control according to an example embodiment.

FIG. 3 is a table illustrating the number of engine diagnostic sessions that found the correct repair solution as a function of the fault code/engine symptom given in the engine diagnostic session according to an example embodiment.

FIG. 4 is a table illustrating where the correct repair solution was located in a list of repair solutions provided in an engine diagnostic session according to an example embodiment.

FIG. 5 is a table illustrating the average position of the correct repair solution in the list of potential repair solutions based on the fault code and/or engine symptoms received in a plurality of engine diagnostic sessions according to an example embodiment.

DETAILED DESCRIPTION

Figure 1:
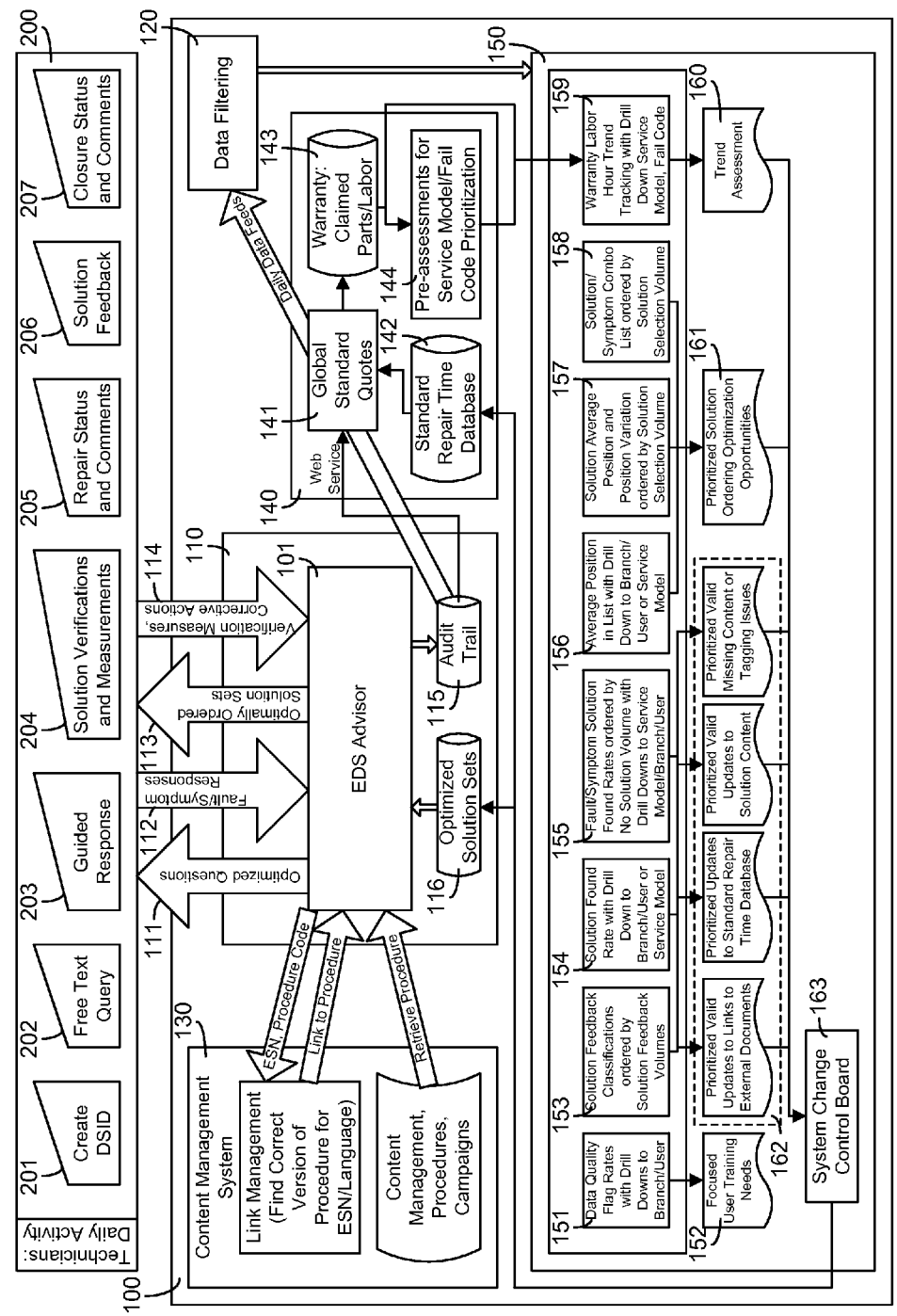
FIG. 1 is a diagram of an engine diagnostic system according to an example embodiment.

Referring to the figures generally, the present disclosure provides an engine diagnostic system and a method of operating the engine diagnostic system. According to the present disclosure, the engine diagnostic system not only captures written feedback from each technician in an engine diagnostic session, but also tracks relevant steps that the technician takes during the engine diagnostic session. The system uses this data to generate an audit trail of the engine diagnostic session. The system may generate a plurality of audit trails, based on technicians working on engine systems all over the word. Based on the plurality of audit trails, the system generates one or more reports that classify the steps taken by the technician into desirable or undesirable behavior patterns that indicate missing or mis-tagged content, inefficiently presented materials, or training issues such as not following troubleshooting guidance. The system may also provide daily updates of troubleshooting statuses of diagnoses being conducted on millions of engine systems, representing a variety of different engine models from around the globe. The system may further provide data reduction techniques and metrics that guide the analysts/service engineers to high priority emerging issues reduced to specific actionable events that can be corrected and immediately monitored for their impacts on the troubleshooting system efficiency measures. Therefore, the technician's direct feedback from a particular engine diagnostic session is utilized to help other technicians working on similar engine systems problems.

In one example, a technician in Indiana troubleshoots a low cylinder pressure in cylinder number three of an 8.3 liter six-cylinder compression-ignition engine. Due to content issues in the repair solutions provided to the technician, the technician performs five different repair solutions on the engine before performing the correct repair solution (repair solution number six). The technician has performed unnecessary work and cost the customer an unnecessary amount of time to fix the customer's engine. Further in the example, a technician in California troubleshoots an engine system with similar symptoms as the engine in Indiana. In the example, the system provides the technician in California with an optimized set of repair solutions based on the feedback from the technician repair event in in Indiana. The system provides a greater likelihood of the technician in California implementing the correct repair solution sooner than otherwise possible, providing the potential for cost and time savings for the customer. Therefore, as the system accumulates feedback from repair events throughout the world, the system is able to optimize repair solutions and fix content issues, document the solutions (e.g. in service manuals), and provide better service to customers.

Thus, the system captures each relevant step a technician takes during the troubleshooting. Accordingly, the systems and methods described herein enable the capture and measure of the diagnostic effectiveness of the troubleshooting guidance provided in an engine diagnostic session, and isolate/prioritize content issues as part of a high volume feedback process. This feedback process supports rapid updates to the verification and repair procedures based on information provided by repair and diagnostic events through direct feedback reporting and through analysis of patterns indicating difficulty in either 1) finding a solution, or 2) given a solution was found, the efficiency in finding the solution. The system also provides an approach for monitoring repeat returns or "fix it right" effectiveness, using data mining and text mining integrated with self-organizing maps to search for sequential patterns, integrated with processes for classification of the return patterns into 1) product issues, 2) usage issues 3) repair quality (e.g. root cause resolution), 4) customer abuse issues, or 5) fuzzy verification processes.

As used herein, the term "repair solution" should be understood broadly, and includes engine troubleshooting guidance provided to a technician for troubleshooting an engine system. Accordingly, "repair solution" may include the repair of, the testing of, the checking of, the replacement of, and/or the inspection of one or more components or consumables of an engine system of a vehicle. For example, one repair solution for an electrical problem in the engine system may be: "1) remove the electrical cable from the negative post of the battery, 2) trace the wire harness from the battery to the fuse center in the cab of the vehicle, 3) check the electrical connections in the fuse box, 4) re-attach the electrical cable to the negative post, 5) test the malfunctioning component." Another repair solution may be: "replace oil filter." Thus, some repair solutions may involve multiple steps and some may be only a single step. However, a technician may perform a repair solution and not fix the engine malfunction. Accordingly, the system may provide the technician with a plurality of repair solutions to perform. As also used herein, the term "symptom" should be understood broadly, and includes a description of an engine malfunction and/or an apparent engine malfunction. For example, a symptom may be: "I hear a strange noise while the engine is idling. I think it may be self-igniting (i.e., engine knock)." The symptom may be provided from the customer, the technician, the customer service intake representative, another person in the repair chain, or combinations of these persons.

Referring now generally to FIG. 1, FIG. 1 is a diagram of a high volume feedback loop for an engine diagnostic system ("EDS") 100. The EDS 100 is an engine diagnostic tool. This tool uses historical trends and advises the most likely steps needed to resolve various engine problems. As mentioned above, service technicians use the EDS 100 to troubleshoot internal combustion engines (e.g., compression-ignition engines), inside and outside the warranty period, both in the service shop and in the field. The EDS 100 recommends to the technician the most likely failed parts based on the customer's complaint, the technician's assessment of symptoms and any fault codes reported by the engine. The result is a relatively greater chance that the engine problem is fixed correctly the first time, without the need for repeat returns.

As shown, the EDS 100 includes a plurality of modules and sub-modules. The modules may include an analytics module 110, a data filter module 120, a content management module 130, a quoting module 140, and a dashboard module 150. The schematic flow diagram of FIG. 1 and related description which follows provides an illustrative embodiment of performing procedures for method 600 of FIG. 6. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

The description herein including the modules emphasizes the structural independence of the aspects of the EDS system 100, and illustrates one grouping of operations and responsibilities of the EDS system 100. Other groupings that execute similar overall operations are understood within the scope of the present application. Modules may be implemented in hardware and/or as computer instructions on a non-transient computer readable storage medium, and modules may be distributed across various hardware or computer based components. While the modules are shown to be separate, one or more modules may be grouped together or otherwise embodied in a single unit. Accordingly, in some example embodiments, the system 100 may be implemented as a general-purpose processor, an application specific integrated circuit (ASIC), one or more field programmable gate arrays (FPGAs), a digital signal processor (DSP), a group of processing components, or other suitable electronic processing components. Moreover, the system 100 may also include one or more memory devices. The one or more memory devices (e.g., RAM, ROM, Flash Memory, hard disk storage, etc.) may store data and/or computer code for facilitating the various processes described herein. Thus, the one or more memory devices may be communicably connected to the system 100 and provide computer code or instructions to the system 100 for executing the processes described in regard to the system 100 (e.g., analytics module 110) herein. Moreover, the one or more memory devices may be or include tangible, non-transient volatile memory or non-volatile memory. Accordingly, the one or more memory devices may include database components, object code components, script components, or any other type of information structure for supporting the various activities and information structures described herein.

Referring more particularly to FIG. 1, the analytics module 110 is shown to include a sub-module, the EDS advisor 101. In the example shown, the EDS advisor 101 serves as an interface for a service technician (or other user of the system 100), where the EDS advisor 101 may enable the exchange of information with the technician. According to an example embodiment, the flowchart 200 may be used to describe a technician's daily activity. In this regard, system 100 and the accompanying modules may be more fully described in relation to the flowchart 200.

Generally, the EDS advisor 101 interacts with the technician to capture an initial complaint and guides the technician through various questions to isolate most likely repair solutions. As such, at process 201, the technician creates an engine diagnostic session that is uniquely identified through a generated engine diagnostic session id (DSID) by the EDS advisor 101. At process 202, the technician may provide the EDS advisor 101 with one or more inputs. One input may include an engine serial number. Based on the engine serial number, the EDS advisor 101 may determine the corresponding engine model (e.g., a straight six-cylinder 8.3 liter engine) and retrieve the service manual (or procedures for servicing/troubleshooting, i.e., repair solutions) for that specific model. This content may be stored in the content management module 130. Accordingly, the content may include service manuals, repair solutions (based on symptoms of an engine malfunction complaint), troubleshooting procedures, and/or other content related to an engine system for a plurality of engine systems (referred to collectively as "engine content" herein). In one example, after the technician enters the engine serial number, the EDS advisor 101 provides a link, which the technician may choose or select. After selection, the EDS advisor 101 retrieves the relevant (i.e., specific to that engine model) engine content from the content management module 130 to provide to the technician.

Next, the technician will enter the complaint (process 202). The EDS advisor 101 will receive the complaint (including any provided engine malfunction symptoms) and map the complaint based on the symptom(s) to recognizable troubleshooting terms to retrieve specific guided questions from the content management module 130. The EDS advisor 101 may proceed to present guided questions in an optimized order (process 111) to determine a root cause of the engine complaint. The optimized guided questions are structured to find the correct repair solution as fast as possible.

At process 203, the technician provides one or more responses to the guided questions. For example, the technician may indicate that no malfunction symptoms regarding an exhaust aftertreatment system or a transmission have been provided. The technician may also provide additional information, such as other symptoms regarding the engine malfunction complaint, any and all accompanying fault codes received, recent but inactive fault codes, and/or other information the technician may deem relevant. For example, the customer may describe the engine as having an unexpectedly high idle speed. The EDS advisor 101 receives the fault codes, responses to the guided questions, and any symptom information (process 112).

Based on the responses, symptoms, fault codes, and any other information provided by the technician, the EDS advisor 101 may provide at least one potential repair solution for the engine malfunction (process 113). In one embodiment, the EDS advisor 101 may provide a plurality of potential repair solutions. However, using the information provided to the EDS advisor 101 for a plurality of engine diagnostic sessions (explained more fully herein), the EDS advisor 101 may optimally list the repair solutions. The optimization may be based on a likelihood that a repair solution is a correct repair solution for the information received by the EDS advisor 101. Each solution may point to a procedure in the content management module 130 that provides the solutions for a given engine configuration and in the desired language (since this is a global application). Moreover, the EDS advisor 101 may also provide information regarding the standard diagnostic and repair times for each solution.

During processes 204-206, the technician may be performing one or more solutions provided by the EDS advisor 101. The EDS advisor 101 receives feedback regarding the performance of the one or more repair solutions at process 114. The feedback of processes 204-206 may include the results of the repair solution; verification of the solution, such as whether the repair solution is out-of-spec (i.e., implementation of the solution still does not meet one or more requirements for functionality of the engine) or whether the solution is accurate; any measurements taken during the implementation of the repair solution (e.g., a cylinder pressure) that may indicate a fix of the engine malfunction; and any other type of information (e.g., written feedback) regarding the performance and results of the repair solution. If the technician finds a solution out-of-spec, the EDS advisor 101 will prompt the technician with the repair procedure and may require the technician to document how the repair was performed. The EDS advisor 101 may then classify the repair solution as successful (repair solution fixed the engine malfunction), unsuccessful (repair solution did not fix the engine malfunction), or whether the customer rejected the quote and the repair was not conducted. Similarly, as mentioned above, the EDS advisor 101 may provide other feedback regarding the repair solution provided. For example, the technician may identify links to a particular repair solution procedure that are not working, content that is incorrect (e.g., a wrong engine model is referenced for a particular repair solution), and the like.

When the technician is done with the troubleshooting, the technician may provide an indication of closing the engine diagnostic session (process 207) to the EDS advisor 101. Closure options may provide valuable information used to classify the sessions. The closure options may include "solved", "solved outside the system", "not repeatable", "original equipment manufacturer issue", "unresolved", "solved by a campaign", and the like.

As mentioned above, the EDS advisor 101 tracks each relevant step taken by the technician during the engine diagnostic session (processes 201-207). Each step in the flowchart 200 is captured in detail in an audit trail generated by the EDS advisor 101 (process 115). The EDS advisor 101 may provide this audit trail to technicians, service engineers, warranty administrators, analytics engineers, etc.

As the system 100 may be utilized by a plurality of technicians for a plurality of engine diagnostic sessions, the EDS advisor 101 may generate a plurality of audit trails. The EDS advisor 101 may provide the plurality of audit trails to the quoting module 140. The quoting module 140 is structured to analyze warranty claims for the engine diagnostic sessions. The quoting module 140 may include sub-modules, including a global standard quotes module 141 that receives the standard repair times from a standard repair time database module 142. The global standard quote module 141 may determine whether the warranty claims associated with an engine diagnostic session have valid standard repair times based on the standard repair times provided by the standard repair time database module 142.

If the global standard quote module 141 determines that the repair time entered for a repair solution in an engine diagnostic session (for a warranty claim) does not match or substantially match (e.g., within a predetermined percentage) the standard repair time, the global standard quote module 141 may outfield the claim for further review by, for example, a warranty administrator. If the global standard quote module 141 determines that the repair time matches or substantially matches, the global standard quote module 141 may provide the claim to a warranty module 143. The warranty module 143 may determine what the claimed parts/labor are and provide this information to at least one of a prioritization module 144 and a warranty drill down module 159 of the dashboard module 150. The prioritization module 144 is structured to organized the claimed parts and labor (e.g., based on expense of the claim). The warranty drill down module 159 enables technicians, service engineers, warranty administrators, analytics engineers, and the like to sort the warranty claims for a plurality of audit trails (engine diagnostic sessions) based on a variety of parameters. Example and non-limiting parameters include the engine model, engine part, type of labor, and/or fault codes involved. A trend assessment module 160 may then organize the warranty claims based on various trends (e.g., all the claims related to this part). Accordingly, users of the system 100 may see where the bulk of the warranty claims are related to (e.g., on a specific engine part). An example system 100 provides information to allow users to develop global fixes to reduce a certain type of warranty claims.

The audit trail data captured in the EDS system 100 acts to support a data based approach to isolating and classifying patterns in repeat returns. The data based approach simplifies the process of isolating and classifying first time fix issues. Previously available systems for analysis of warranty data for repeat returns required complex text mining of claims data to isolate symptom/cause relationships needed for first time fix pattern detections.

The EDS advisor 101 may also provide the plurality of audit trails, and/or information based on the audit trails, to a data filtering module 120. The data filtering module 120 is structured to evaluate each engine diagnostic session based on the audit trail. The evaluation captures high level properties, such as who created the DSID, who had it last, the creation and closure dates, current status (e.g. open, closed, and closure types), number of successful repairs found, average position that the repair solutions were found in the list presented, number of verifications that were performed, the number of symptoms entered, whether the technician followed the repair solution (e.g., performed steps in order, did not skip steps, etc.), and the like. The evaluation may take several days to a week to complete for some engine diagnostic sessions. The data filtering module 120 may also be structured to provide data quality indicators that detect improper use of the tool. Improper use may include too many symptoms entered, no symptoms entered, no verifications of the repair solutions documented, etc. In some example embodiments, when the data filtering module 120 determines improper use or another low quality data indicator, the data filtering module 120 removes that specific audit trail from the audit trails provided to the dashboard module 150. The data filtering module 120 may also restructure the audit trails (not removed) into data packages that support high volume processing. For example, the data filtering module 120 may compress the data to reduce its size and filter out the determined low-quality data to not only reduce the size but also insure a quality plurality of audit trails (and reports) are used in the system 100.

In an example operation, the technicians are responsible for following troubleshooting guidance (e.g., repair solution) and making a reasonable effort to find the correct repair solution. However, technicians may not always follow the guidance or make a reasonable effort to document the troubleshooting. Via filtering module 120, data quality flags can be set when usage patterns indicate the technician is not following guidance (e.g., skipping steps when performing a repair solution). These flags allow for the filtering of audit trails. System 100 administrators and/or data analysts may use these filters to remove low quality audit trails from the analysis and focus on true content issues as part of the high volume filtering.

The filtered audit trails may then be provided to the dashboard module 150. In some embodiments, the removed audit trails may also be provided to the dashboard module 150. As shown in FIG. 1, the dashboard module 150 may include a plurality of sub-modules that perform a variety of operations on the audit trails. As a general overview, the dashboard module 150 is structured to receive the plurality of audit trails and determine/develop new approaches/repair solutions, isolate patterns that indicate training or content issues in the system, and/or otherwise analyze the audit trails for various trends and places where improvement may be made. Accordingly, the dashboard module 150 may be structured to perform a variety of operations. The operations may be related to a data quality process (module 151). At module 151, the audit trails may be organized based on where the low quality data is coming from (e.g., a service branch and/or a specific service technician). As used herein, the term "drill down controls" refers to operations to narrow the data based on a one or more parameters. Example and non-limiting narrowing parameters include service branch location, date or date range, technician, engine categories (e.g., model, a particular component of the engine, etc.), and/or combinations of these. Drill down controls may quickly guide technicians to the root causes through a process of auto-prioritization and quick filtering. For example—the success rate metric (FIG. 2) has a corresponding drill down tab where the worst performing locations or service models are shown. The individual data within the audit trails may be isolated with summary content or the audit trails themselves may be used by the dashboard module 150 to create packages for training or for service engineers for further assessment.

The reports, including the audit trails and individual data within the audit trails, may be provided to one or more system 100 administrators that develop focused training programs for these groups. In some embodiments, the dashboard module 150 (via module 151) may provide this information as an organized list. For example, branches 1, 5, and 9 are routinely providing low-quality data as indicated in the audit trails. Accordingly, focused training (module 152) should be utilized with branches 1, 5, and 9.

The operations may also include solution feedback classifications (module 153). The classification of the feedback may be based on the solution performed (i.e., same or similar repair solutions are grouped), the component of the engine system the repair solution relates to, symptoms received for the engine malfunction, and/or some other grouping criteria. The operations may further include a solution found rate determination (module 154). Based on the feedback in the plurality of audit trails, the solution found rate determination module 154 may determine how often the correct repair solution was found. For example, FIG. 2. shows a drill down control for a solution found rate as a function service location (e.g., Newark). As shown in FIG. 2, solution found rate is a function of service location. In turn, system 100 administrators may determine where potential issues exist (e.g., the branch that has the lowest solution found rate may indicate that additional training is needed at that location).

The operations may also include an engine fault code/symptom solution found rate (module 155) that may also include a drill down feature (e.g., based on service location, technician, engine model, etc.). Module 155 may determine the success rate based on the fault codes and/or engine symptoms received in an engine diagnostic session. For example, FIG. 3 shows an example fault code/engine symptom graphical analysis. As seen in FIG. 3, module 155 may provide information regarding a success rate based on fault codes/engine symptoms received for a plurality of engine diagnostic sessions. This data may be taken from the plurality of audit trails.

Another operation of the dashboard module 150 may include a determination of an average position in the list of potential solutions of the correct solution (module 156). As mentioned preceding, the EDS advisor 101 may provide an improved or optimally ordered list of repair solutions (process 113). The EDS advisor 101 includes data in the audit trail that details where the correct repair solution was found in the list of repair solutions. Accordingly, FIG. 4 shows an example of a table showing where the repair solution was located in the list of repair solutions provided in a plurality of engine diagnostic sessions. Module 156 may also utilize drill down controls to provide information regarding the average position of the correct repair solution in the list of potential repair solutions based on service location, technician, date, and/or engine categories. In a related manner, a position variation of the repair solution in the list of potential solutions (module 157) may also be determined. Module 157 may determine the variation of the average position of the correct repair solution for specific selection of audit trails. Variation information may be useful for system 100 administrators to pinpoint various issues.

Still another operation of the dashboard module 150 may include a combination solution/symptom combination list (module 158). FIG. 5 shows an example output from module 158, based on module 158 determining and providing the average position in the list of potential repair solutions of the correct repair solution based on the fault code and/or engine symptoms received in a particular engine diagnostic session. Accordingly, audit trails for engine diagnostic sessions based on similar received engine symptoms and/or fault codes may be grouped together.

As shown, the dashboard module 150 may include a plurality of additional sub-modules. These sub-modules may include a solution ordering optimization module 161 and a plurality of prioritized modules (collectively referred to as prioritization module 162). The results from modules 156-158 may be provided to the solution ordering optimization module 161. The solution ordering optimization module 161 is structured to use those determinations to optimally provide potential repair solutions (process 111) based on the received engine malfunction symptoms, fault codes, and other information. In turn, a subsequent technician who provides similar information to the EDS advisor 101 may receive a list of potential repair solutions that is optimized to help the technician find the correct repair solution in the shortest amount of time. Similarly, the prioritization modules 162 may use the results of the determinations of modules 153-155 to determine if an update is needed to the standard repair time database (e.g., a particular repair solution has taken most technicians four hours to perform rather than the expect two hours); links to various engine content stored in engine content module 130 may need to be updated, replaced, or otherwise changed; and, the content in the repair solutions and otherwise in the content management module 130 may be determined to be incorrect, incomplete, or otherwise lacking such that an update or edit is needed.

In one example embodiment, the dashboard module 150 further includes a system change control board module 163. Module 163 is structured to receive the output from the prioritization module 162 and the solution ordering optimization module 161. In some embodiments, at this point, a system administrator may approve, reject, review, and/or place on hold the determinations of such modules. For example, the system administrator may accept the change to a standard repair time, which is then provided to the quoting module 140. In another example, the optimized solution sets based on engine symptoms and/or fault codes may be accepted, which the dashboard module 150 then provides to the EDS advisor 101 (process 116).

In an alternate embodiment, one or more determinations by the dashboard module 150 (and its accompanying sub-modules) are provided directly to the EDS advisor 101 in lieu of the system change control board module 163. In this embodiment, the daily or periodically received data from technicians may constantly impact what is provided by the EDS advisor 101 to subsequent technicians. Accordingly, the system 100 may be automated to continuously improve over time via the accumulation of more and more engine diagnostic session data (included in the audit trails). Thus, an example system 100 may capture the entire repair history of an engine regardless of who the service provider is, and regardless of whether or not the engine was under warranty.

Figure 6:
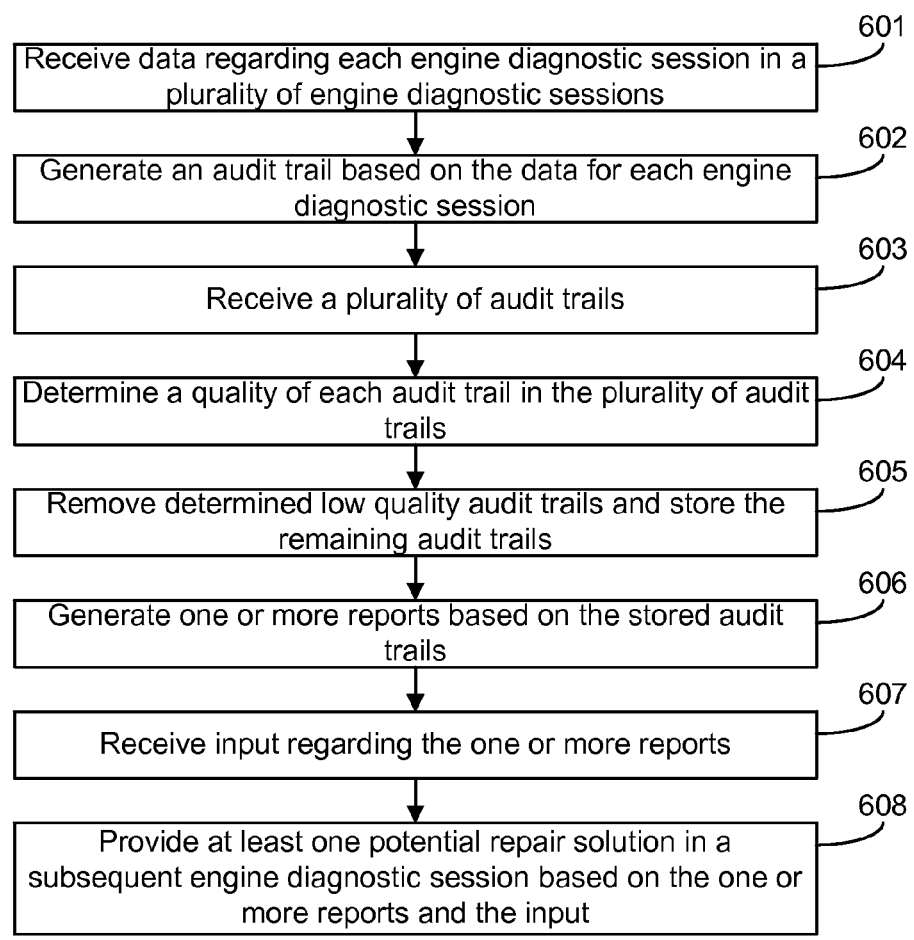
FIG. 6 is a flowchart of operating an engine diagnostic system according to an example embodiment.

Referring now to FIG. 6, a flowchart of a method 600 of operation of an engine diagnostic system is shown according to an example embodiment. According to one embodiment, method 600 may be utilized in connection with system 100. As such, the processes of method 600 may be described in regard to the functions of one or more modules described and shown in FIG. 1.

Method 600 may begin by receiving data regarding an engine diagnostic session in a plurality of engine diagnostic sessions (601). The data may include a technician identification; a closure date of an engine diagnostic session; a current status of an engine diagnostic session; feedback regarding a repair solution in an engine diagnostic session; one or more steps performed in an engine diagnostic session; a symptom of an engine malfunction; one or more guided questions; responses to the one or more guided questions; list of repair solutions provided; and a classification of a repair solution, the classification including at least one of a correct repair solution, an incorrect repair solution, and a not performed repair solution. In regard to FIG. 1, the data received is in regard to flowchart 200 and processes 111-114.

Based on the data, an audit trail is generated for each engine diagnostic session in the plurality of engine diagnostic sessions (602). Accordingly, as mentioned above, the audit trail represents each relevant step taken by the technician during an engine diagnostic session.

In one embodiment, several audit trails may be received (603). At which point, the quality of each audit trail may be determined (604) (e.g., via data filtering module 120). As mentioned above, the data filtering module 120 is structured to evaluate each engine diagnostic session, based on the session's audit trail. In some embodiments, when the data filtering module 120 determines improper use or another low quality data indicator, the data filtering module 120 removes that specific audit trail (605). The remaining audit trails may be stored for later processing. In an alternate embodiment, even determined low-quality audit trails are stored for processing because these audit trails may provide valuable information, such as why the audit trail is of low-quality and what caused the technician to enter too many symptoms.

Based on the stored audit trails, one or more reports may be generated (606) by, e.g., dashboard module 150. As mentioned above, in some embodiments, the stored audit trails include both determined quality and low-quality audit trails. The reports refer generally to the output of the dashboard module 150 and all of its sub-modules. Accordingly, the report may include information such as an indication of a correct repair solution found rate; an average position of a correct repair solution in a list of potential repair solutions; an average number of steps taken by a technician to find a correct repair solution; a piece of incorrect content in one or more repair solutions; likely root cause information for a plurality symptoms of engine malfunctions; and a categorization of the stored engine diagnostic session data based on a similarity of a symptom of an engine malfunction received in the data for each engine diagnostic session.

For example, a report may indicate that an applicable solution does not appear when the technician enters a specific symptom. An applicable solution may not appear because the content is completely missing from the knowledge base, or because the content exists but is not matched with the correct symptom/service model. Accordingly, the lack of an applicable solution may be provided to, for example, a system 100 administrator and/or the EDS advisor 101. In some embodiments, the EDS advisor 101 may then match the applicable solution to the applicable engine symptom that was not otherwise available. In turn, if a similar engine symptom is provided by a technician in a subsequent engine diagnostic session, the EDS advisor 101 may provide the applicable solution (608) based on the report of a previous engine diagnostic session. Accordingly, the technician may be able to troubleshoot the engine relatively faster than what otherwise would have been possible.

In another example, the correct solution may be too far down the solution list, causing the technician to do unnecessary verifications to reach the solution. The generated reports may reflect this organizational issue. The EDS advisor 101 may receive this information and adjust the solution list to provide to technicians that provide similar engine symptoms and/or respond to guided questions in a similar fashion as that detailed in the report that depicted the organizational issue (608).

As mentioned above, the one or more reports may be provided to a system 100 administrator. Accordingly, the system 100 may receive an input from the system administrator (607). The input may include an adjustment, a viewing, and/or another input to effect/adjust/or change something discovered in or more reports. For example, a system administrator may adjust the solution list ordering for specific engine symptoms to ultimately help technicians in the future troubleshoot these issues. The input may also include a drill down control. The technician may drill down to the details of one or more reports to search provided repair solution lists and extract comments to aid in grouping the data into like issues for generating prioritized work packages. Moreover, to isolate the symptoms used to get to the repair solutions, the system 100 administrator and/or technician may filter the reports based on the symptom to see where that solution was typically positioned relative to other solutions. The administrator may then isolate opportunities to further optimize the position of the solutions and present these opportunities to the solution authors and the EDS content control board for a fix.

Accordingly, based on the input (607) and/or the updates provided by the dashboard module 150 in response to the one or more reports, one or more potential repair solutions may be provided to a technician in a subsequent engine diagnostic session (608). The one or more potential repair solutions may reflect the content issues, feedback, and output of the dashboard module 120. Therefore, repair solutions provided in subsequent engine diagnostic sessions may be improved and/or optimized based on the reports generated and analyzed in previous engine diagnostic sessions.

Figure 7:
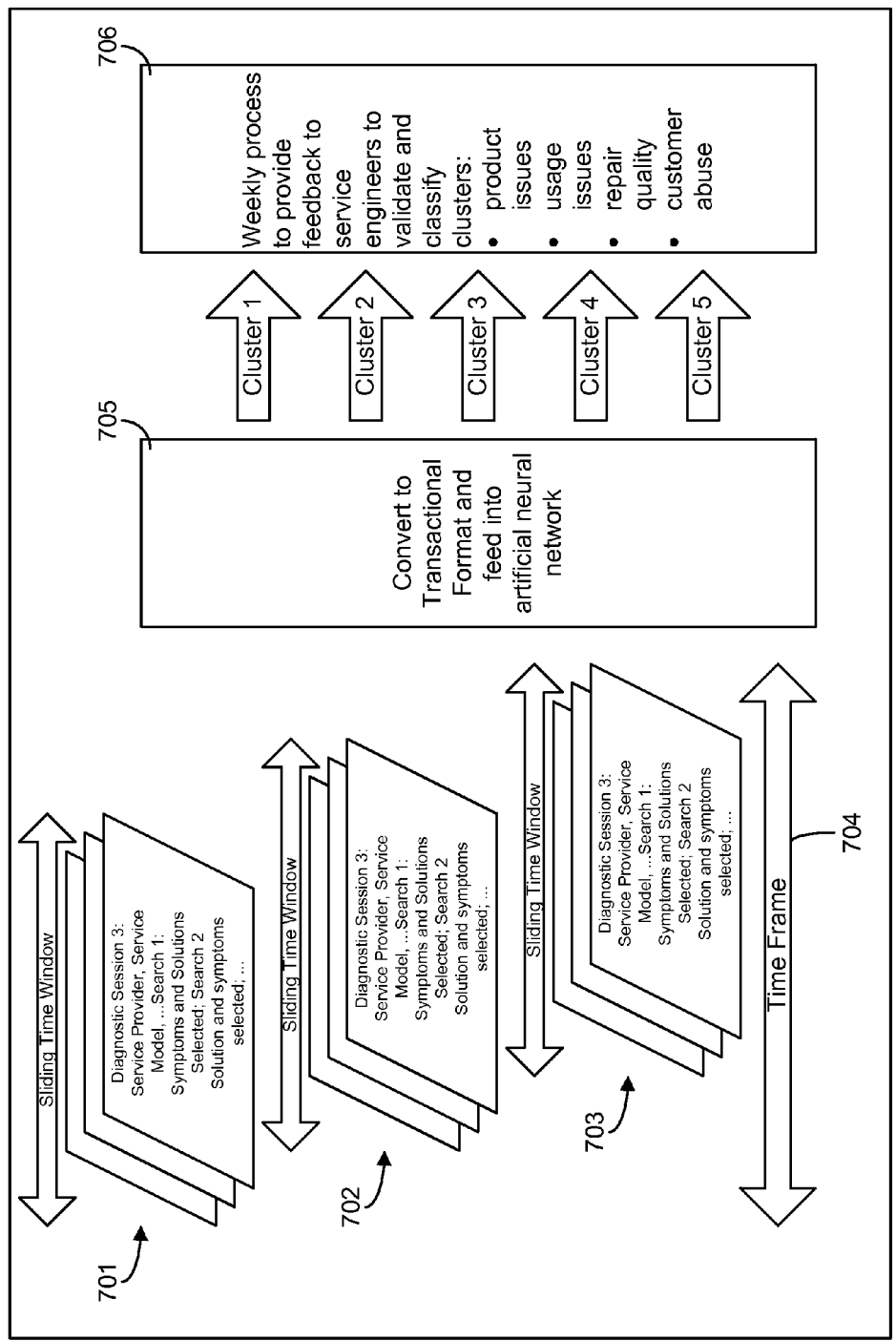
FIG. 7 is a clustering and classification flowchart for an engine diagnostic system according to an example embodiment.

The data based symptom/solution nature of the EDS system 100 also supports a data based approach to isolating and classifying patterns in repeat returns. Referring to FIG. 7, a clustering and classification flowchart for repeat returns experienced by the EDS system 100 is shown according to an example embodiment. As used herein, the term repeat return refers to a repeat visit to a technician for a same or similar malfunction of an engine system. In some example embodiments, the amount of repeat returns may be limited by a predetermined time frame. In one example, a return within a three month period is determined to be a repeat return. The period utilized to define a repeat return can be selected according to the type of malfunction, or may be the same for each malfunction. An example period selection for a repeat return is determined based upon an expected failure rate and/or service interval for a particular malfunction and/or engine or vehicle feature. If a customer brings the vehicle back to a technician for a similar engine malfunction that was examined by the technician four months ago, the system 100 may view this later engine diagnostic session as a first time visit for this problem rather than a repeat return. Nonetheless, the history of that engine system may be documented and stored regardless of it being a first or a subsequent visit.

Because the audit trail captures each step taken in an engine diagnostic session and the dashboard module classifies and/or organizes that data, the data in the system 100 is already data based (i.e., stored and organized, such that it may be examined and analyzed at a later date). In regard to a repeat return, the symptoms used during the diagnosis, plus the solutions found that document the related problem and corrective actions chosen are stored for the first diagnostic session (or any previous engine diagnostic session). More generally, the entire repair history of an engine serial number ("ESN") is captured in the EDS system regardless of who the service provider is, and regardless of whether or not the engine was under warranty.

Thus, FIG. 7 outlines the general process flow for assessments of repeat returns and first time fix using the feedback from the EDS system. First, the EDS system 100 isolates the candidate repeat returns using a sliding window across a fixed time frame. Engine serial number repair history that meets the criteria of a having a minimum of X returns in a Y month window are candidates for further processing as a repeat returns. FIG. 7 shows the example of three engine systems, by engine serial number (701-703), over a predetermined time frame 704. The time frame chosen may be adjusted by system 100 administrators to further define when a repeat return occurs. The information of 701-703 may be captured by the EDS advisor 101 of the engine diagnostic system 100. This information may be inputted into an artificial neural network module 705. In one embodiment, the artificial neural network module 705 is included with the dashboard module 150. The artificial neural network module 705 is structured to convert the transactional format of the data (information of 701-703) into one or more patters (i.e., cluster 1-5). The clusters may be based on a similarity of engine symptoms, symptom and solution combinations, engine model, engine serial number, service location, and the like. In one example embodiment, the artificial neural network module 705 utilizes a "self-organizing map" (e.g., a "Kohonen self-organizing map") which outputs diagnostic sequences based on one or more of the cluster patterns listed above.

The high volume clusters may be provided to system 100 administrators and/or directly to the EDS advisor 101 for further processing and analysis. For example, the high volume clusters may be further assessed by service engineering and classified as product issues, application/usage issues, repair quality, customer abuse or fuzzy verification processes. Decision rules for these clusters may be built into module 705 or into the system 100 elsewhere via decision trees to isolate future occurrences of these patterns.

It should be noted that the term "example" and/or "exemplary" as used herein to describe various embodiments is intended to indicate that such embodiments are possible examples, representations, and/or illustrations of possible embodiments (and such term is not intended to connote that such embodiments are necessarily extraordinary or superlative examples).

A system that utilizes the present disclosure can take the form of an implementation done entirely in hardware, entirely in machine-readable media, or may be an implementation containing both hardware-based and machine-readable-based elements. In some embodiments, this disclosure may be implemented in machine-readable and/or computer-readable medium, which includes, but is not limited to, one or more physical or logical blocks of computer instructions which may, for instance, be organized as an object, procedure, or function. Furthermore, the system and method of the present invention can take can take the form of a computer program product accessible from a computer-usable or computer-readable medium providing program code for use by or in connection with a computer, or any instruction execution system including a hard wired logic circuit, or the equivalent. For the purposes of this description, a computer-usable or computer-readable medium can be any apparatus that can contain, store, communicate, propagate, or transport the program or non-transient signals or information generated thereby for use by or in connection with the instruction execution system, apparatus, or device. Further a computer-readable medium includes the program instructions for performing operations of the present invention. In one implementation, a computer-readable medium carries a data processing or computer program product used in a processing apparatus which causes a computer to execute in accordance with the present invention. Computer readable instructions stored on one or more non-transient media for execution of the present invention, and executed by one or more processing devices is also envisioned.

The media can include electronic, magnetic, optical, electromagnetic, infrared, or solid state system (or apparatus or device) or a propagation medium, or a signal tangibly embodied in a propagation medium at least temporarily stored in memory. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

What is claimed is:

1. An engine diagnostic system comprising:
an analytics module structured to receive data regarding each engine diagnostic session in a plurality of engine diagnostic sessions, and generate an audit trail based on the data for each engine diagnostic session;
a data filtering module structured to receive a plurality of audit trails and determine a quality of each audit trail in the plurality of audit trails, wherein each determined quality audit trail is stored and each determined low quality audit trail is removed, and wherein the determined low quality is based on an indication of the analytics module receiving at least one of too many and too few symptoms regarding an engine malfunction in an engine diagnostic session; and
a dashboard module structured to receive each stored audit trail and provide one or more reports related to each stored audit trail;
wherein the analytics module is structured to receive the one or more reports and provide at least one potential repair solution in a subsequent engine diagnostic session based on the one or more reports.

2. The system of claim 1, wherein the analytics module is further structured to receive a symptom of an engine malfunction in the subsequent engine diagnostic session, provide a guided question based on the symptom, receive a response to the guided question, and provide the at least one potential repair solution based on the response to the guided question.

3. The system of claim 1, wherein the analytics module is structured to provide an ordered list of the at least one potential repair solution, wherein the ordered list is ordered based on a likelihood that a repair solution is a correct repair solution for a symptom received in the subsequent engine diagnostic session.

4. The system of claim 1, further comprising a quoting module structured to determine that a warranty engine repair claim associated with an engine diagnostic session has a valid repair time for troubleshooting the warranty engine repair.

5. The system of claim 1, wherein the data includes at least one of a technician identification; a closure date of an engine diagnostic session; a current status of an engine diagnostic session; written feedback regarding a repair solution in an engine diagnostic session; one or more steps performed in an engine diagnostic session; a symptom of an engine malfunction; a response to a provided guided question; and a classification of a repair solution, the classification including at least one of a correct repair solution, an incorrect repair solution, and a not performed repair solution.

6. The system of claim 1, wherein the one or more reports include at least one of an indication of a correct repair solution found rate; an average position of a correct repair solution in a list of potential repair solutions; an average number of steps taken by a technician to find a correct repair solution; a piece of incorrect content in one or more repair solutions; likely root cause information for a plurality of symptoms of engine malfunctions; and a categorization of the stored engine diagnostic session data based on a similarity of a symptom of an engine malfunction received in the data for each engine diagnostic session.

7. An engine diagnostic system comprising:
an analytics module structured to:
receive a symptom of an engine malfunction in a first engine diagnostic session;
provide a guided question based on the symptom;
receive a response to the guided question;
provide at least one potential repair solution based on the response to the guided question;

receive data regarding the first engine diagnostic session; and generate an audit trail based on the data, the provided guided question, and the received response;

a quoting module structured to determine that a warranty engine repair claim associated with an engine diagnostic session in the plurality of engine diagnostic sessions has a valid repair time for troubleshooting the warranty engine repair claim; and a dashboard module structured to receive a plurality of audit trails for a plurality of engine diagnostic sessions and provide one or more reports related to the plurality of audit trails;

wherein the analytics module is further structured to receive the one or more reports, receive a symptom of an engine malfunction in a subsequent engine diagnostic session, and provide a subsequent at least one potential repair solution based on the one or more reports.

8. The system of claim 7, furthering comprising a data filtering module structured to receive the plurality of audit trails and determine a quality of each audit trail in the plurality of audit trails, wherein each determined quality audit trail is stored and each determined low quality audit trail is removed.

9. The system of claim 8, wherein the determined low quality is based on an indication of the analytics module receiving at least one of too many and too few symptoms regarding the engine malfunction.

10. The system of claim 7, wherein the analytics module is structured to provide an ordered list of the subsequent at least one potential repair solution, wherein the ordered list is ordered based on a likelihood that a repair solution is a correct repair solution for the symptom received in the subsequent engine diagnostic session.

11. The system of claim 7, wherein the data includes at least one of a technician identification; a closure date of an engine diagnostic session; a current status of an engine diagnostic session; written feedback regarding a repair solution in an engine diagnostic session; one or more steps performed in an engine diagnostic session; a symptom of an engine malfunction; and a classification of a repair solution, the classification including at least one of a correct repair solution, an incorrect repair solution, and a not performed repair solution.

12. The system of claim 7, wherein the one or more reports include at least one of an indication of a correct repair solution found rate; an average position of a correct repair solution in a list of potential repair solutions; an average number of steps taken by a technician to find a correct repair solution; a piece of incorrect content in one or more repair solutions; likely root cause information for a plurality symptoms of engine malfunctions; and a categorization of the stored engine diagnostic session data based on a similarity of a symptom of an engine malfunction received in the data for each engine diagnostic session.

13. A method of troubleshooting an engine in an engine diagnostic session, comprising:

receiving, by an engine diagnostic system having one or more processors combined with one or more memory devices, data regarding each engine diagnostic session in a plurality of engine diagnostic sessions;

generating, by the engine diagnostic system, an audit trail based on the data for each engine diagnostic session;

receiving, by the engine diagnostic system, a plurality of audit trails;

determining, by the engine diagnostic system, a quality of each audit trail in the plurality of audit trails, wherein each determined quality audit trail is stored and each determined low quality audit trail is removed, and wherein the determined low quality is based on an indication of receiving at least one of too many and too few symptoms regarding an engine malfunction in an engine diagnostic session; and generating, by the engine diagnostic system, one or more reports related to each stored audit trail; and providing, by the engine diagnostic system, at least one potential repair solution in a subsequent engine diagnostic session based on the one or more reports.

14. The method of claim 13, further comprising receiving, by the engine diagnostic system, a symptom of an engine malfunction in the subsequent engine diagnostic session, providing a guided question based on the symptom, receiving a response to the guided question, and providing the at least one potential repair solution based on the response to the guided question.

15. The method of claim 13, further comprising providing, by the engine diagnostic system, an ordered list of the at least one potential repair solution.

16. The method of claim 15, wherein the ordered list is ordered based on a likelihood that a repair solution is a correct repair solution for a symptom received in the subsequent engine diagnostic session.

17. The method of claim 13, wherein the data includes at least one of a technician identification; a closure date of an engine diagnostic session; a current status of an engine diagnostic session; written feedback regarding a repair solution in an engine diagnostic session; one or more steps performed in an engine diagnostic session; a response to a provided guided question; a symptom of an engine malfunction; and a classification of a repair solution, the classification including at least one of a correct repair solution, an incorrect repair solution, and a not performed repair solution.

* * * * *